Nov. 13, 1956  A. J. FRIES ET AL  2,770,280
ANTI-SKID APPARATUS FOR MOTOR VEHICLES
Filed Feb. 15, 1956  2 Sheets-Sheet 1
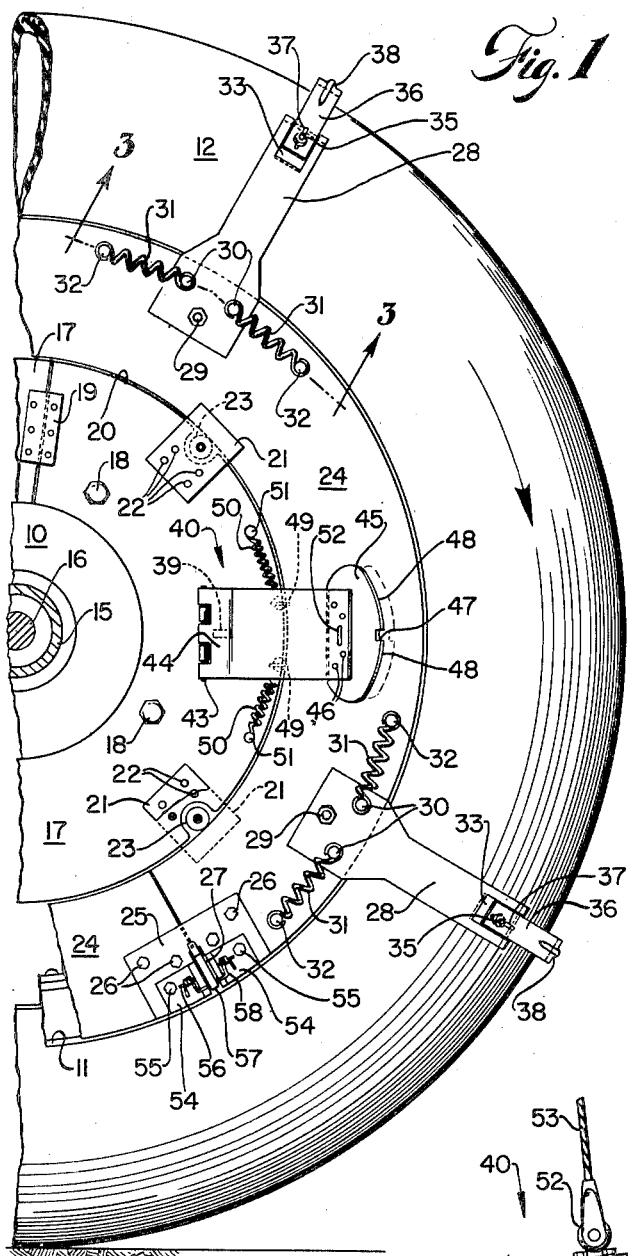
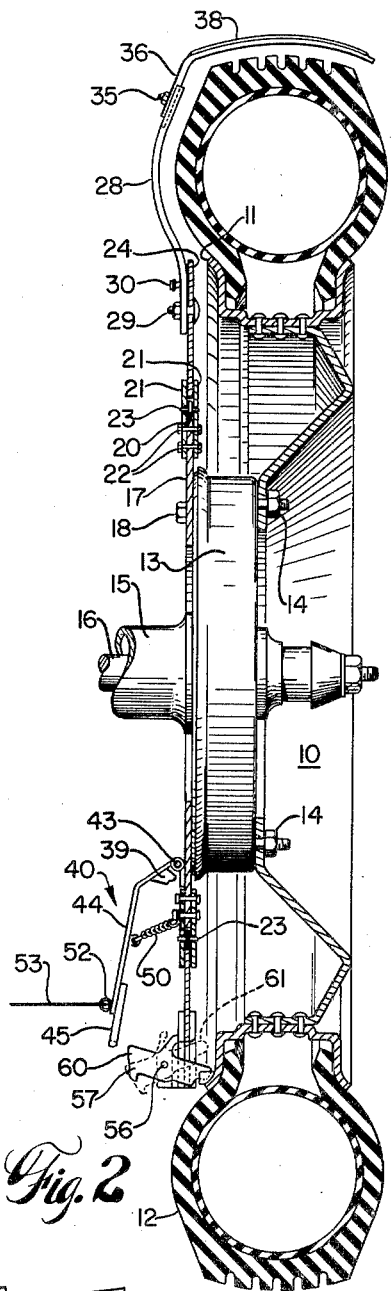
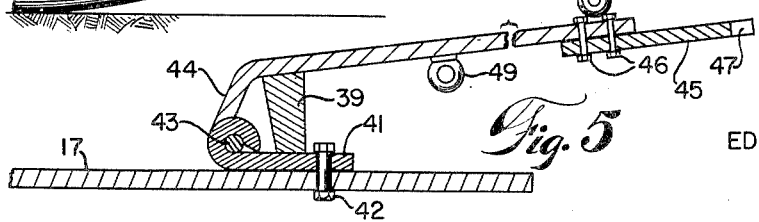
INVENTORS
ADAM J. FRIES
EDWARD J. HOFFMAN

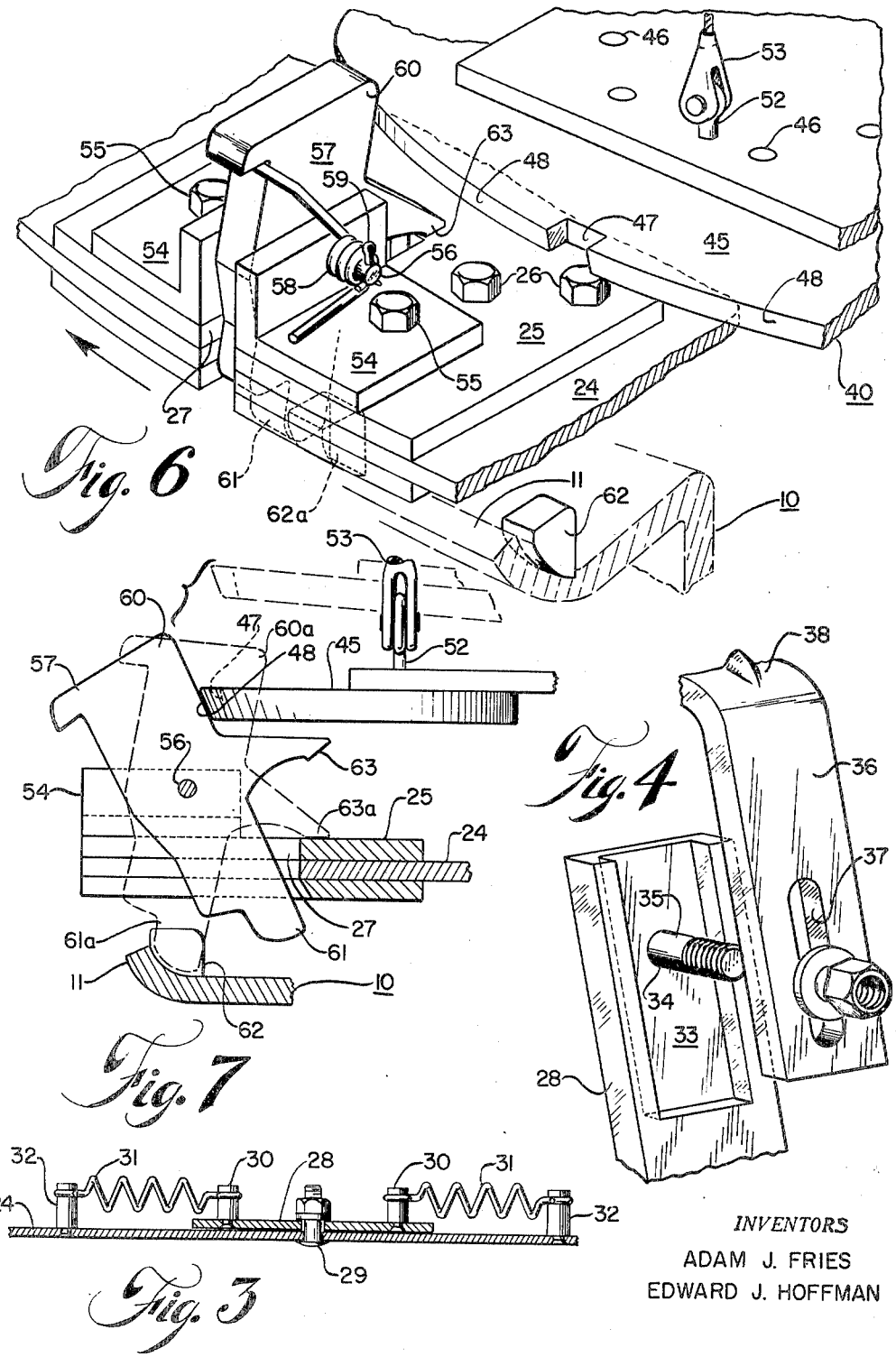

United States Patent Office 2,770,280
Patented Nov. 13, 1956

2,770,280

ANTI-SKID APPARATUS FOR MOTOR VEHICLES

Adam J. Fries and Edward J. Hoffman, Pittsburgh, Pa.

Application February 15, 1956, Serial No. 565,580

5 Claims. (Cl. 152—216)

The present invention relates to anti-skid apparatus for use in combination with the driving wheels of motor vehicles.

One object of the present invention is to provide anti-skid apparatus which can be installed on existing vehicles or can be added to vehicles as original factory equipment.

Another object of the present invention is to provide anti-skid apparatus which will neither experience wear nor interfere with the normal operation of motor vehicles when they are in use on non-slippery road surfaces and which can be placed into anti-skid operation by the vehicle operator without leaving the driving compartment of the vehicle.

A further object of this invention is to provide anti-skid apparatus which can be readily dismantled and removed from assembly on a motor vehicle during summer months when its use is not required and can be reassembled with equal facility when its extended intermittent use can be anticipated.

A still further object of this invention is to provide anti-skid apparatus which does not interfere with the wheel replacement operation.

Yet another object of the invention is to provide anti-skid apparatus having ground gripping cleats which are yieldable to conform with the outer periphery of the vehicle tires and are maintained in close contact with the tire during the period when they are also in anti-skid contact with the road surface, thereby preventing stones and debris from plugging the space between tire and cleats. Such plugging would interfere with the operation of the anti-skid apparatus and result in undue bumpiness in the ride of the vehicle.

Further objects and advantages of the present invention will appear from the following detailed description and accompanying drawings in which:

Figure 1 is an orientation view from inboard of a fragment of a rear driving wheel of a motor vehicle equipped with the anti-skid apparatus of the present invention;

Figure 2 is a view partly in section and partly in elevation of the driving wheel of Figure 1 showing the wheel assembly and the anti-skid apparatus of the present invention;

Figure 3 is a cross-section view of cleat arm securing means taken along the line 3—3 of Figure 1;

Figure 4 is a sectional view of the cleat securing means of the present invention;

Figure 5 is an enlarged cross-sectional view of a hinged swivel latch bracket;

Figure 6 is a fragmentary perspective view of a trigger element having a dual function of securing the anti-skid apparatus in an inoperative position through cooperation with the hinged swivel latch bracket of Figure 5 and also of activating the anti-skid apparatus by engaging a lug secured to the inner flange of the wheel rim; and Figure 7 is a fragmentary sectional view showing the trigger and latch element in the inoperative position for the anti-skid apparatus and, in phantom outline, the trigger, latch element and wheel rim lug in the operative position for the anti-skid apparatus.

The apparatus of the present invention is provided for each rear driving wheel of a motor vehicle. The left rear driving wheel 10, shown in Figures 1 and 2, is provided with a flanged inner rim 11 which serves as one supporting surface for a vehicle tire 12. The wheel 10 in conventional practice is secured to a brake drum 13 by bolts 14. The brake drum in turn is secured to a rotatable axle 16 mounted within a rigid axle housing 15. As thus far described, the apparatus illustrated in Figures 1 and 2 is generally applicable to any conventional motor vehicle.

Secured in rigid relation to the axle housing 15 is a circular plate 17 formed from two semi-circular plates having semi-circular cut-out portions at the center to conform with the axle housing 15 and adapted to be mounted by means of bolts 18 extending through the brake-drum housing to define a generally vertical circular support having an outer periphery 20, extending beyond the outer periphery of the brake drum 13. A clamping plate 19 may be provided for added support of the two halves of the circular plate 17. Pairs of guide plates 21 are provided at spaced points about the periphery 20 of the circular plate 17, mounted by means of bolts 22 extending through the holes in the circular plate 17, and extending beyond the periphery 20 thereof. The totality of pairs of guide plates 21 define a circular channel having as its bottom the periphery 20 of the circular plate 17. If desired, anti-friction rollers 23 may be rotatably mounted between the associated pairs of guide plates.

A rotatable cleat support ring 24 is provided comprising two flat semi-ring portions adapted to be joined at their ends by means of a clamping plate 25 with bolts 26 to form the support ring 24. The circular inner surface of the support ring 24 fits into the channel formed by the periphery 20 of the circular plate 17 and the pairs of guide plates 21 and is freely rotatable within said channel, which itself is rigidly supported.

One of the clamping plates 25 is provided with a trigger slot portion 27 for receiving a trigger 57 as will hereinafter be described.

Mounted at spaced points along the rotatable cleat support ring 24 are cleat arms 28 swivelly secured at one end by bolts 29 extending transversely through the cleat support ring 24. The cleat arms 28 extend radially and are concavely arced to a position spaced from the tire 12. A spring securing stud 30 is provided on the cleat arm 28 at each side of the swivel bolt 29 radially outwardly therefrom. A corresponding spring securing stud 32 is provided on the cleat support ring 24 at each side of the cleat arm. A spring 31 is secured in tension between each stud 30 and the corresponding stud 32. At the extremity of the cleat arm 28 a channel 33 is provided (see Figure 4) for receiving the securing portion 36 of a cleat 38. The securing portion 36 of the cleat 38 has a slot 37 for receiving a cleat securing bolt 35 which extends through an opening in the base of the channel 33 whereby the cleat securing portion 36 may be rigidly secured to the cleat holder 28. The slot 37 permits adjustment of the radial position of the cleat 38 to permit use of the apparatus with tires of various sizes and conditions of wear.

A hinged swivel latch bracket 40 (see Figure 5) is provided comprising a base hinge plate 41 and a pivotal hinge plate 44 secured in pivotal relation about a pin 43. The base hinge plate 41 has a circular opening through which a bolt 42 swivelly secures it to the circular plate 17. The pivotal hinge plate 44 extends radially from the hinge pin 43 and inwardly toward the circular plate 17. At the extremity of the pivotal hinge plate 44 a latch element 45 is secured by means of bolts 46. The latch element 45 has arced cam surfaces 48 and a central slot 47. The function of the slot 47 is to engage the locking portion 60 of the trigger 57 when the anti-skid apparatus of the present invention is in a non-operative position as will be hereinafter described. The pivotal hinge plate 44 has a reverse bend back upon the base hinge plate 41 whereby the extremity of the pivotal hinge plate 44 and the latch element 45 secured thereto are normally positioned substantially parallel to the circular plate 17. The pivotal hinge plate 44 is biased in this normal position by means of springs 50 secured between securing studs 49 mounted at each side thereof, and securing studs 51 mounted on the circular plate 17. A motion limiting stop element 39 may be provided on the pivot hinge plate 44 or the base hinge plate 41 for regulating the normal angular relation of the two hinge plates 41 and 44. The bias provided by the dual function springs 50 serves to retain the pivotal hinge plate 44 in a normal position substantially parallel to the circular plate 17 and also serves to resiliently resist swivel movement of the entire hinged swivel latch bracket 40 about the swivel bolt 42 out of a normally radially extending position. A pull rod bracket 52 on the pivotal hinge plate 44 is provided for securing a pull rod 53 which, when displaced, moves the pivotal hinge plate 44 about the hinge pin 43 away from the circular plate 17.

Mounted in the trigger slot 27 of the rotatable cleat support ring 24 is a trigger 57 which is pivotally secured by a pin member 56 journaled between two angle brackets 54 which are rigidly secured to the clamping plate 25 by means of bolts 55. (See Figure 6). The trigger 57 has a locking portion 60 extending inboard from the rotatable cleat support ring 24. The locking portion 60 is releasably engageable in the slot 47 of the latch element 45 to hold the rotatable cleat support ring 24 against rotation when the anti-skid apparatus is non-operative. The trigger 57 also has a lug-engaging portion 61 which extends outboard beyond the rotatable cleat support ring 24 into the zone of the wheel 10 through a plane defined by the flanged inner rim 11 thereof. A lug 62 is provided on the flanged inner rim 11 to engage the lug-engaging portion 61 of the trigger 57 when the anti-skid apparatus is operative. A motion limiting extension 63 (see Figure 7) may be provided on the trigger 57 to limit the pivotal movement of the trigger 57 in the clockwise direction under the normal urging of a spring 58 which is shown in Figure 6 as coiled about each end of the trigger pin 56 and held thereon by a cotter pin 59.

The operation of the anti-skid apparatus of the present invention will now be described.

In the inoperative position of the anti-skid apparatus, the latch element 45 is in the position indicated by the solid lines of Figure 7—i. e., the pivot hinge plate 44 is generally parallel to the circular plate 17, being urged into this position by means of the springs 50. The locking portion 60 of the trigger 57 is engaged in the slot 47 which engagement secures the rotatable cleat support ring 24 against rotation and also secures the trigger 57 in the counterclockwise displaced position indicated by the solid lines of Figure 7, i. e., with the motion limiting portion 63 out of contact with the clamping plate 25 and the lug engaging portion 61 of the trigger 57 displaced from the locus of movement of the tire rim lug 62. The latch element 45 holds the trigger in the position indicated by the solid lines of Figure 7 against the urging of the trigger spring 58.

In this inoperative position of the anti-skid apparatus, the rotatable cleat support ring 24 is maintained in a fixed position with respect to the axle housing 15; the wheel 10 and tire 12 are free to rotate without interference from the anti-skid apparatus. The ground engaging portion of the tire 12 lies between the same two adjoining cleats 38 at all times when the anti-skid apparatus is non-operative.

When the vehicle operator desires to place the anti-skid apparatus into operation, manually actuated mechanical means (not shown) are employed to pull the pull rod 53 for the pivot hinge plate 44, causing the pivot hinge plate 44 to pivot about the pin 43 of the hinged swivel latch bracket 40 and thus to move the pivot hinge plate 44 and latch element 45 to the operative position indicated by the dotted lines in Figure 7. The numerals in Figure 7 which are succeeded by the letter "$a$" indicate the position of the elements when the anti-skid apparatus is operative.

As the latch element 45 swings away from the circular plate 17, the locking portion 60 of the trigger 57 is disengaged from the slot 47 and urged into its alternate position by means of the trigger spring 58. The clockwise movement of the trigger 57 about the pin 56 is limited when the motion limiting portion 63 strikes the clamping plate 25. Thus in the operative position of the anti-skid apparatus, the trigger 57 assumes the position indicated by the dotted line portions in Figure 7. The lug engaging portion 61$a$ of the trigger 57 is now in a position to engage the lug 62 secured to the flanged inner rim 11 of the wheel 10 and the rotatable cleat support ring 24 is now free to rotate in the circular channel formed by the periphery 20 of the circular plate 17 and the guide plates 21. Before the wheel 10 thereafter makes one complete revolution (either in a forward moving or reverse moving direction), the lug 62 on the rim 11 of wheel 10 engages the lug engaging portion 61$a$ of the trigger 57 and thereafter, continued wheel rotation causes the lug engaging portion 61 and the rotatable cleat support ring 24 to rotate at the same speed as the wheel so long as the operative condition is maintained.

Thus the rotatable cleat support ring 24 and the cleats 38 are fixed relative to the wheel 10 during operation. As the cleat 38 enters ground engaging contact, the cleat holder 28 is swivelly displaced about the bolt 29 to a position wherein the cleat 38 is in concurrent contact with the periphery of the tire 12 and the ground, thereby minimizing stresses within the cleat 38 and the cleat holder 28. Further rotation of the wheel releases the cleat 38 from ground engaging contact and the springs 31 reposition the cleat holder 28 to move the cleat 38 once more out of contact with the periphery of the tire 12.

In the event the direction of the wheel rotation is changed while the anti-skid apparatus is operative, the lug 62 is disengaged from contact with the lug-engaging portion 61$a$ of the trigger 57 until the wheel 10 makes one complete revolution in the new, reversed direction. Thereupon the other side of the lug 62 engages the other side of the lug-engaging portion 61$a$ of the trigger 57 and the cleats 38 again are fixed relative to the wheel 10 so long as the wheel rotational direction remains unchanged. To minimize this lag in operativeness, a plurality of lugs 62 may be spaced about the flanged inner rim 11 of the wheel 10.

In order to render the anti-skid apparatus once more inoperative, the vehicle operator again employs manually actuated mechanical means to release the pull rod 53 of the pivot hinge plate 44. Thereupon the springs 50 cause the pivot hinge plate 44 and latch element 45 to return to the position parallel to the circular plate 17 as shown by the solid lines of Figure 7. At this particular moment, the anti-skid device is still in an operative position since the lug engaging portion 61$a$ of the trigger 57 remains in engagement with the lug 62 on the wheel rim 11. During the next succeeding rotation of the wheel 10, however, whether in a forward moving or reverse moving direction, the trigger 57 will approach the fixed location of the latch element 45. Further rotation of the wheel 10 finds the locking portion 60$a$ of the trigger 57 engaging one of the arced cam surfaces 48 (depending upon whether the vehicle is moving in a forward or reverse direction). Movement of the locking portion 61 of the trigger 57 along the arced cam surface 58 results in a counterclockwise movement of the trigger 57 about the pin 56 (see Figure 7) which moves the lug engaging portion 61 of the trigger 57 counterclockwise out of engagement with the lug 62 on the wheel rim 11 and frees the rotatable cleat support ring 24 from its fixed relation with respect to the rotating wheel structure. Following this disengagement, the locking portion 60 of the trigger 57 drops into the slot 47 of the latch element 45 and the normal non-operative conditions prevail once more, i. e., the cleats 38 are maintained out of contact with the ground and out of contact with the tire 12 in the same initial position.

Provision of the resiliently swiveled mounting of the base hinge plate 41 through the bolt 42 permits the vehicle operator to place the anti-skid apparatus in an operative or non-operative condition despite continuing movement of the vehicle without undue stresses within the structure. Movement of the locking portion 60 of the trigger 57 along the arced cam surface 48 of the latch element 45 causes a swivel displacement of the hinged swivel latch bracket 49 to occur, which displacement is resiliently resisted by the dual function springs 50.

The resiliently swiveled mounting of the hinged swivel latch bracket 40 provides protection against sudden shocks to the cleats 38. In the event one cleat 38 is pressed against the periphery of the tire 12, as by contact with a rock or partial immersion of the tire 12 in mud, the entire cleat support ring 24 and associated cleat structures will tend to rotate with the wheel 10. The rotation moves the kinged swivel latch bracket 40 swivelly about the bolt 42 as a result of the rotational movement of the locking portion 60 of the trigger 57 cooperatively with the latch element 45. If the rotation continues, the locking portion 60 of the trigger 57 slides from the swivelly displaced slot 47 of the latch element 45. The latch element 45 thereupon returns to its normal inoperative position under the urging of the dual function springs 50. The anti-skid apparatus then becomes operative when the lug 62 on the rim 11 of the wheel 10 engages the lug engaging portion 61 of the trigger 57 and remains operative for one complete revolution of the apparatus until normal disengagement occurs as previously described.

For actuating the anti-skid apparatus, any mechanical linkage which results in pivotal movement of the pivot hinge plate 44 is suitable. The pull rod 53 shown in the drawings may be displaced by solenoids operated from the vehicle's driving compartment, or by direct cable connections controlled by levers, pedals, buttons and the like, or by hydraulic or similar means which are within the skill of the art. Suitable apparatus for actuating our present invention is shown in United States Patent 2,532,309 of which the present inventors are co-patentees. Where we have illustrated the components as having bolts, pins, lugs and other mechanical elements, it is within the scope of the invention to provide the mechanical equivalents thereof.

It should be noted that the entire apparatus of this invention may be removed readily from the vehicle during summer months when its use is not required. Removal may be effected without disturbing the wheel and tire assembly. Alternatively, the cleat support ring 24, its cleat holders 28 and cleats 38 may be removed by disconnecting the clamping plates 25 from one of the semi-ring portions of the cleat support ring 24 which permits recovery of the rotatable portions of the apparatus in two readily stored sections. The remaining portions of the apparatus conveniently may be carried on the vehicle throughout the year, especially when the apparatus is provided as factory-installed equipment on the vehicle.

It should be noted also that the apparatus of the present invention does not interfere with or affect in any way the normal replacement of the wheel and tire assembly of the vehicle.

And now, according to the provisions of the patent statutes, we have described our present invention and illustrated its preferred embodiment and desire to have it understood that, within the scope of the appended claims, the invention may be practiced otherwise than as specifically illustrated and described.

We claim:

1. An anti-skid apparatus for intermittent use in combination with a driving wheel and tire assembly of a motor vehicle comprising a rotatable ring spaced inboard of said wheel for rotation coaxially therewith in a plane parallel thereto, a plurality of resiliently pivotally mounted cleat elements carried at spaced points by said ring extending radially therefrom and outwardly transversely to the periphery of said tire and normally spaced therefrom, pivotal trigger means carried by said ring, actuating means on the outboard extension of said trigger means engageable with said wheel and tire assembly for securing said ring therewith, securing means for said ring on the inboard extension of said trigger means, latch means carried by said motor vehicle adapted to releasably engage said securing means and displace said actuating means from engagement with said wheel and tire assembly whereby said ring is non-rotatably retained.

2. An anti-skid device according to claim 1 wherein the rotatable cleat support ring is formed from a plurality of partial ring portions, and releasable securing means for joining said partial ring portions.

3. An anti-skid apparatus for intermittent use in combination with a driving wheel and tire assembly of a motor vehicle comprising a rotatable ring spaced inboard of said wheel for rotation coaxially therewith in a plane parallel thereto, a plurality of resiliently pivotally mounted cleat elements carried at spaced points by said ring extending radially therefrom, pivotal trigger means carried by said ring, actuating means on the outboard extension of said trigger means engageable with said wheel and tire assembly for securing said ring therewith, securing means for said ring on the inboard extension of said trigger means, pivotal latch means swivelly carried by said motor vehicle adapted to releasably engage said securing means and displace said actuating means from engagement with said wheel and tire assembly whereby said ring is non-rotatably retained.

4. An anti-skid apparatus for intermittent use in combination with a driving wheel and tire assembly of a motor vehicle comprising a circular plate carried by said motor vehicle defining at its periphery a circular channel coaxial with said wheel and secured to said motor vehicle inboard of said wheel, a ring rotatably carried in said channel for rotation coaxially with said wheel in a plane parallel thereto, a plurality of resiliently pivotally mounted cleat members carried at spaced points by said ring extending radially therefrom and outwardly transversely to the periphery of said tire and normally spaced therefrom, pivotal trigger means carried by said ring, actuating means on the outboard extension of said trigger means engageable with said wheel and tire assembly for securing said ring therewith, securing means for said ring on the inboard extension of said trigger means, pivotal latch means swivelly carried by said circular plate, said latch means being adapted to releasably engage said securing means and displace said actuating means from engagement with said wheel and tire assembly whereby said ring is non-rotatably retained in said channel.

5. An anti-skid apparatus for intermittent use in combination with a driving wheel and tire assembly of a motor vehicle comprising a circular plate carried by said motor vehicle defining at its periphery a circular channel coaxial with said wheel and secured to said motor vehicle inboard of said wheel, a ring rotatably carried in said channel for rotation coaxially with said wheel in a plane parallel thereto, a plurality of resiliently pivotally mounted cleat members carried at spaced points by said ring extending radially therefrom and outwardly transversely to the periphery of said tire and normally spaced therefrom, pivotal trigger means carried by said ring comprising actuating means and securing means, said actuating means extending outboard of said ring into the rotational plane of said wheel and engageable with at least one lug carried on the inner rim of said wheel when the apparatus is in an operative condition, resilient means urging said trigger means into an operative condition, said securing means extending inboard of said ring, pivotal latch means swivelly carried by said circular plate, said latch means comprising a base plate and a hinged plate in hinged relation to each other, said base plate being swivelly secured to said circular plate, releasable retaining means at the extremity of said hinged plate comprising an arced surface having therein a slot adapted to receive said securing means, resilient means for biasing said latch means against swivel motion out of a normally radially extending position and also for urging said hinged plate toward said base plate, and central means operable from the driving compartment of said motor vehicle for pivotally displacing said hinged plate away from said base plate whereby said latch means are disengaged from said securing means when the apparatus is in an operative condition.

References Cited in the file of this patent

UNITED STATES PATENTS

| | | |
|---|---|---|
| 2,126,961 | Hodgkinson | Aug. 16, 1938 |
| 2,229,830 | White | Jan. 28, 1941 |